(12) United States Patent
Yuasa

(10) Patent No.: US 8,538,372 B2
(45) Date of Patent: Sep. 17, 2013

(54) UNIVERSAL MESSAGING

(75) Inventor: Go Yuasa, Rancho Palos Verdes, CA (US)

(73) Assignee: Honda Motor Co., Ltd., Minato-ku, Tokyo (JP)

( * ) Notice: Subject to any disclaimer, the term of this patent is extended or adjusted under 35 U.S.C. 154(b) by 265 days.

(21) Appl. No.: 13/102,006

(22) Filed: May 5, 2011

(65) Prior Publication Data
US 2012/0282876 A1 Nov. 8, 2012

(51) Int. Cl.
*H04M 11/04* (2006.01)

(52) U.S. Cl.
USPC .................................. 455/404.1; 455/404.2

(58) Field of Classification Search
USPC ............................................ 455/404.1, 404.2
See application file for complete search history.

(56) References Cited

U.S. PATENT DOCUMENTS

| | | | |
|---|---|---|---|
| 5,890,054 A * | 3/1999 | Logsdon et al. ............. 455/11.1 |
| 6,166,656 A | 12/2000 | Okada et al. |
| 6,249,232 B1 | 6/2001 | Tamura et al. |
| 6,313,758 B1 | 11/2001 | Kobayashi |
| 6,324,393 B1 | 11/2001 | Doshay |
| 6,340,928 B1 * | 1/2002 | McCurdy ..................... 340/436 |
| 6,580,981 B1 | 6/2003 | Masood et al. |
| 6,614,362 B2 | 9/2003 | Siegel |
| 6,642,844 B2 | 11/2003 | Montague |
| 6,765,495 B1 | 7/2004 | Dunning |
| 7,046,168 B2 | 5/2006 | Tsuboi |
| 7,158,016 B2 | 1/2007 | Cuddihy |
| 7,272,357 B2 | 9/2007 | Nishiga |
| 7,289,786 B2 | 10/2007 | Krasner |
| 7,363,117 B2 | 4/2008 | Tengler et al. |
| 7,425,903 B2 | 9/2008 | Boss et al. |
| 8,073,422 B2 * | 12/2011 | Langsenkamp et al. ... 455/404.1 |
| 8,208,891 B2 * | 6/2012 | Jacobs et al. ............... 455/404.1 |
| 2002/0198660 A1 | 12/2002 | Lutter |
| 2005/0088318 A1 * | 4/2005 | Liu et al. ...................... 340/902 |
| 2005/0184862 A1 | 8/2005 | Nagata |

(Continued)

FOREIGN PATENT DOCUMENTS

| | | |
|---|---|---|
| JP | 11167689 A | 6/1999 |
| JP | 2002208080 A | 7/2002 |

OTHER PUBLICATIONS

Bocci, Paul et al., "Connected Cars on Wireless Roads: Making it a Reality", , 3 pages, IEEE, 2006.

(Continued)

*Primary Examiner* — Nathan Mitchell
(74) *Attorney, Agent, or Firm* — Capitol City TechLaw; Richard C. Irving

(57) ABSTRACT

A communicating device may determine a lack of wireless network coverage. The communicating device may repeatedly send a message via a narrow-band communication medium. One or more other communicating devices may receive the message via the narrow-band communication medium. Later, when a communicating device that received the message has the wireless network coverage, the message may be transmitted to an originally intended recipient via the wireless network. The intended recipient may send a reply message to one or more communicating devices via the wireless network. When a communicating device that received the reply message no longer has the wireless network coverage, the communicating device may send the reply message via the narrow-band communication medium to one or more other communicating devices. The communicating device, that originally sent the message, may receive the reply message and may present information from the reply message to a user.

21 Claims, 9 Drawing Sheets

(56) References Cited

U.S. PATENT DOCUMENTS

| | | | |
|---|---|---|---|
| 2005/0200479 | A1 | 9/2005 | James |
| 2007/0285512 | A1 | 12/2007 | Kitani et al. |
| 2008/0042825 | A1 | 2/2008 | Denny et al. |
| 2008/0055068 | A1 | 3/2008 | Van Wageningen et al. |
| 2008/0140287 | A1 | 6/2008 | Yang et al. |
| 2008/0316053 | A1* | 12/2008 | Boss et al. ............... 340/902 |
| 2009/0002145 | A1 | 1/2009 | Berry et al. |
| 2010/0173603 | A1* | 7/2010 | Kwak et al. ............. 455/404.1 |
| 2011/0003578 | A1* | 1/2011 | Chen et al. .............. 455/404.1 |
| 2012/0252398 | A1* | 10/2012 | Jacobs et al. ............ 455/404.1 |

OTHER PUBLICATIONS

Duressi, Mimoza et al., "Intervehicle Communication Protocol for Emergency Situations", 6 pages, Proceedings of the 8th International Symposium on Parallel Architectures, Algorithms and Networks, IEEE, 2005.

Roy, Siuli et al., "Service Differentiation in Multi-hop Inter-Vehicular Communication using Directional Antenna", 5 pages, IEEE, 2004.

Inoue, Takahiro et al., "An Analysis of Incident Information Transmission Performance using an IVC System that assigns PN codes to the Locations on the Road", 6 pages, 2004 IEEE Intelligent Vehicles Symposium, Parma, Italy, Jun. 14, 2004.

Blum, Jeremy J., "Fast, Robust Message Forwarding for Inter-vehicle Communication Networks", 6 pages, 2006 IEEE Transportation Systems Conference, Toronto, Canada, Sep. 17, 2006.

Abstract of Japanese Patent Publication JP11167689A, published Jun. 22, 1999.

Abstract of Japanese Patent Publication JP2002208080A, published Jul. 26, 2002.

Abstract of South Korean Patent Publication KR2005032345A, published Apr. 7, 2005.

Abstract of South Korean Patent Publication KR2008010216A, published Jan. 30, 2008.

* cited by examiner

UNIVERSAL MESSAGING

BACKGROUND

1. Field of the Invention

The present teachings relate to a method and a system for sending a message from a communicating device to an intended recipient. In particular, the present teachings relate to a method and a system for sending a message from a communicating device in an area having no wireless network coverage to an intended recipient having wireless network coverage.

2. Discussion of the Related Art

An existing safety and security service for an automobile may employ a communicating device such that the communicating device may contact a call center under circumstances in which a user may need assistance. The communicating device may be built into the automobile or may be a portable communicating device integrated with the automobile's existing safety and security service via a narrow-band communication medium. For example, if the automobile becomes disabled or is involved in an accident, the communicating device may contact the call center, via a wireless phone network, in order to request assistance.

Typically, a coverage area for a wireless phone network includes metropolitan areas having large populations. Areas that have few people are more likely to have a lack of wireless phone network coverage. In such areas having no wireless phone network coverage, the communicating device of the existing safety and security service for the automobile is incapable of contacting the intended recipient. As a result, the user may be stranded without assistance in a sparsely populated area.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A communicating device, which may be located within a disabled vehicle outside of an area covered by a wireless network, may attempt to send a message to an intended recipient. The intended recipient may include, but not be limited to, a call-center accessible via the wireless network. The communicating device may determine that the communicating device has no access to the wireless network, which may include, but not be limited to, a wireless phone network. The communicating device may then make a determination regarding whether any vehicles are likely to be within a communicating range of the communicating device. If vehicles are determined to be within the communicating range, the communicating device may send the message via a narrow-band communication medium.

A second communicating device within a second vehicle may receive the message via the narrow-band communication medium and may retransmit the received message via the narrow-band communication medium. The retransmitted message may be received by a third communicating device within a third vehicle. When a communicating device that received the message, via the narrow-band communication medium, determines itself to be within an area having access to the wireless network, the communicating device may send the message to the intended recipient via the wireless network.

The intended recipient may receive a message and may send a reply message to respective communicating devices in one or more vehicles within the area having access to the wireless network. When a vehicle of the one or more vehicles leaves the area having access to the wireless network, the respective communicating device may transmit the reply message via the narrow-band communication medium. Other communicating devices within other vehicles may receive the reply message via the narrow-band communication medium and may retransmit the reply message via the narrow-band communication medium such that additional communicating devices may receive the reply message.

The communicating device within the disabled vehicle may receive the reply message via the narrow-band communication medium and may present information included within the reply message to a user within the disabled vehicle.

In other embodiments, the reply message may include a stop sending signal, which may cause the communicating device within the disabled vehicle to stop sending the message.

In some embodiments, the message sent from the communicating device within the disabled vehicle may be an emergency message. The reply message may include an estimated arrival time of a rescue team, a location of a waiting place, and other information.

BRIEF DESCRIPTION OF THE DRAWINGS

In order to describe the manner in which the above-recited features and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Overview

Figure 1:
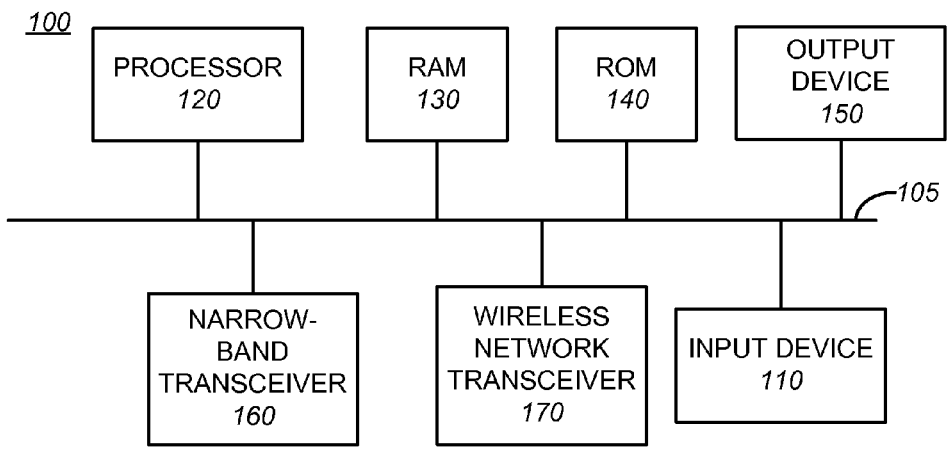
FIG. 1 is a functional block diagram of a communicating device in one embodiment.

In some embodiments, a communicating device of a first vehicle may attempt to send a message to an intended recipient including, but not limited to, a call center. The communicating device may determine a lack of coverage by a wireless network. The wireless network may include, but not be limited to, a wireless phone network. When the communicating device determines the lack of coverage, the communicating device may determine whether any vehicles are likely to be within a communicating range of the communicating device. If vehicles are determined to be likely within the communicating range of the communicating device, the communicating device may send the message for the intended recipient to a second communicating device of a second vehicle via a narrow-band communication medium. In some embodiments, the intended recipient may include a call center accessible via the wireless phone network.

The second communicating device may retransmit the message via the narrow-band communication medium and the message may be received by a third communicating device of a third vehicle. When one of the second communicating device or the third communicating device determines itself to be within an area having the coverage by the wireless network, the one of the second communicating device or the third communicating device may send the message to the intended recipient via the wireless network. As mentioned previously, in some embodiments, the intended recipient may include a call center.

In response to receiving the message, the call-center may determine one or more vehicles, having the coverage by the wireless network, that are traveling in a direction toward the first vehicle. The call-center may then send, to respective communicating devices of the determined one or more vehicles, a second message intended for the communicating device of the first vehicle. The second message may be a response message sent via the wireless network in response to the call-center receiving the message.

When one of the determined one or more vehicles is later located in an area in a vicinity of the communicating device of the first vehicle, the respective communicating device of the one of the determined one or more vehicles may transmit the second message via the narrow-band communication medium. A third communicating device of a third vehicle may receive the message and also may transmit the second message via the narrow-band communication medium while located in the area in the vicinity of the communicating device of the first vehicle. The communicating device of the first vehicle may receive the message via the narrow-band communication medium and may display information included in the received second message to a user of the first vehicle.

In some embodiments, the message may include an emergency message indicating a desire for assistance. The second message may include information including, but not limited to, a command for the communicating device of the first vehicle to stop sending the message, an expected arrival time of a rescue team, a closest waiting place, and/or other information.

In variations of the above-mentioned embodiments, the communicating device of the first vehicle may determine whether any vehicles having communicating devices are likely to be within a communicating range. If vehicles are likely to be within the communicating range, then if the number of vehicles likely to be within the communicating range is less than a predefined number, such as, for example, 1, 3, or another number, then the communicating device may decrease a strength of a transmitting signal. If the number of vehicles likely to be within the communicating range is more than a second predefined number, such as, for example, 5, 7, or another number, then the communicating device may increase a strength of the transmitting signal. In this way, battery power is conserved when a probability that the message will be received by a communicating device of another vehicle is low.

Exemplary Computing Device

FIG. 1 is a functional block diagram which illustrates an exemplary communicating device 100, which may be included in various embodiments. Communicating device 100 may include a bus 105, an input device 110, a processor 120, a memory, which may include a random access memory (RAM) 130 and a read only memory (ROM) 140, an output device 150, a narrow-band transceiver 160 and a wireless network transceiver 170. Bus 105 may permit communication between processor 120 and components of computing device 100.

Processor 120 may include at least one conventional processor or microprocessor that interprets and executes instructions. RAM 130 may be a random access memory (RAM) or another type of dynamic storage device that stores information and instructions for execution by processor 120. RAM 130 may also store temporary variables or other intermediate information used during execution of instructions by processor 120. ROM 140 may include a conventional ROM device or another type of static storage device that stores static information and instructions for processor 120.

Input device 110 may include one or more conventional mechanisms that permit a user to input information to communicating device 100, such as, for example, a keyboard, a touchscreen, a microphone, or other input device. Output device 150 may include a speaker, a display screen, or other output device for providing output to the user.

Narrow-band transceiver 160 may include any transceiver-like mechanism that enables communicating device 100 to communicate with other devices via a narrow-band communication medium. Wireless network transceiver 170 may include a transceiver-like mechanism that enables communicating device 100 to communicate over a wireless network, through which communicating device 100 may communicate with other devices. In various embodiments, the wireless network may include, but not be limited to, a wireless phone network.

Computing device 100 may perform such functions in response to processor 120 executing sequences of instructions contained in a computer-readable storage medium, such as, for example, ROM 140, RAM 130, or other storage medium capable of storing instructions and data with some degree of permanence.

Figure 2:
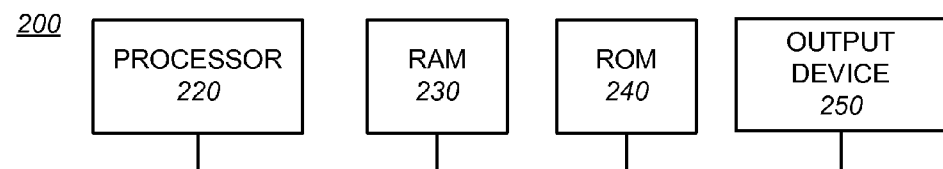
FIG. 2 is a functional block diagram of a communicating device in a second embodiment.
Figure 2:
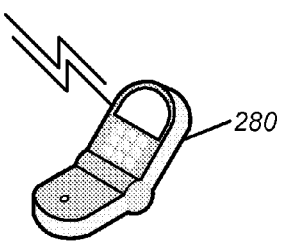

FIG. 2 is a functional block diagram which illustrates a second exemplary communicating device 200, which may be included in various embodiments. Communicating device 200 may include a bus 205, an input device 210, a processor 220, a memory, which may include a random access memory (RAM) 230 and a read only memory (ROM) 240, an output device 250, a narrow-band transceiver 260 and a short-range transceiver 270. Bus 205 may permit communication between processor 220 and components of computing device 200.

Processor 220 may include at least one conventional processor or microprocessor that interprets and executes instructions. RAM 230 may be a random access memory (RAM) or another type of dynamic storage device that stores information and instructions for execution by processor 220. RAM 230 may also store temporary variables or other intermediate information used during execution of instructions by processor 220. ROM 240 may include a conventional ROM device or another type of static storage device that stores static information and instructions for processor 220.

Input device 210 may include one or more conventional mechanisms that permit a user to input information to communicating device 200, such as, for example, a keyboard, a touchscreen, a microphone, or other input device. Output device 250 may include a speaker, a display screen, or other output device for providing output to the user.

Narrow-band transceiver 260 may include any transceiver-like mechanism that enables communicating device 200 to communicate with other devices via a narrow-band communication medium. Short-range wireless transceiver 270 may include a transceiver-like mechanism that enables communicating device 200 to communicate over a short distance with a portable communicating device 280, which may include, but not be limited to, a mobile phone. In some embodiments, short-range wireless transceiver 270 may include a Bluetooth® wireless transceiver (Bluetooth is a registered trademark of Bluetooth Sig, Inc., a Delaware Corporation). In various embodiments, portable communicating device 280 may be used by communicating device 200 to communicate with the other devices via a wireless network. The wireless network may include, but not be limited to, a wireless phone network.

Computing device 200 may perform such functions in response to processor 220 executing sequences of instructions contained in a computer-readable storage medium, such as, for example, ROM 240, RAM 230, or other storage medium capable of storing instructions and data with some degree of permanence.

Exemplary Operating Environment

Figure 3:
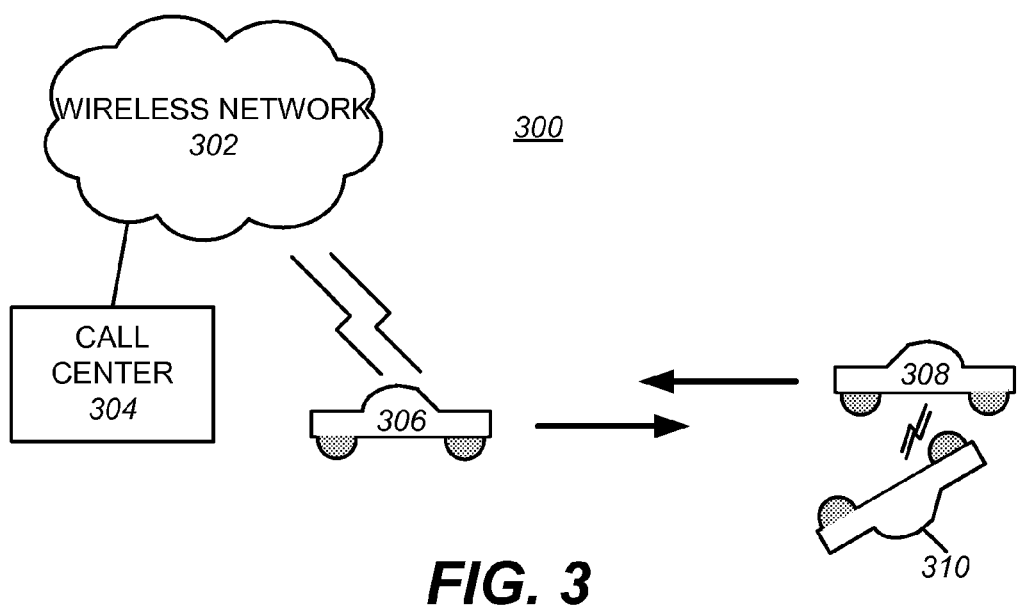
FIG. 3 illustrates an exemplary operating environment for a number of embodiments.

FIG. 3 illustrates an exemplary operating environment 300 for various embodiments. Operating environment 300 may include a network 302, a call center 304 and a number of vehicles 306, 308 and 310 having respective communicating devices therein. The communicating device of vehicle 306 may communicate with network 302 via a wireless network including, but not limited to, a wireless phone network. Network 302 may be a single network or a network of networks. For example, network 302 may include a wireless network, a wired network, a public switched telecommunication network (PSTN), a wireless phone network, a fiber optic network, and/or other types of networks.

As an example of operation in an embodiment, vehicle 310 may become disabled due to mechanical problems or as a result of an accident. The communicating device of vehicle 310 may attempt to contact call center 304 via a wireless network, which may include, but not be limited to, a wireless phone network. The communicating device may determine that it is outside of a coverage area of the wireless network and may then send a message via a narrow-band communication medium. A second communicating device of vehicle 308 may receive the message. Vehicle 308 may be traveling toward an area covered by a wireless network. Once vehicle 308 is within the area covered by the wireless network, the second communicating device may send the message to an intended recipient, call center 304, via the wireless network included within network 302. In some embodiments, the message may include an emergency message indicating a location of disabled vehicle 310 as well as other information.

Alternatively, vehicle 308 may continue to retransmit the message via the narrow-band communication medium while outside of the area covered by the wireless network. A third communicating device of a third vehicle may receive the message and may continue to retransmit the message via the narrow-band communication medium. Similarly, one or more other communicating devices of one or more other vehicles may receive the message via the narrow-band communication medium and may retransmit the message via the narrow-band communication medium while outside of the area covered by the wireless network. When a vehicle that received the message via the narrow-band communication medium enters the area covered by network 302, the communicating device of the vehicle may send the message to the intended recipient, call center 304, via the wireless network of network 302.

Call center 304 may receive the message, and in response to receiving the message, may send a second message, intended for the communicating device of vehicle 310, to a respective communicating device of one or more vehicles within the area covered by the wireless network, such as, for example, vehicle 306. In some embodiments, call center 304 may select the one or more vehicles within the area covered by the wireless network based on a location of the one or more vehicles and a direction of travel of the one or more vehicles. When any of the one or more vehicles that received the second message leaves the area covered by the wireless network, the one or more respective communicating devices may transmit the second message via the narrow-band communication medium. Vehicles within a communicating range may receive the second message and may retransmit the second message via the narrow-band communication medium while outside of the area covered by the wireless network. Eventually, the communicating device of disabled vehicle 310 may receive the second message via the narrow-band communication medium and may present information from the second message to a user of vehicle 310. In some embodiments, the second message may include a stop sending signal to inform the communicating device of vehicle 310 to stop transmitting the message. The second message may also include other information including, but not limited to, an arrival expectation time of a rescue team and a closest waiting place.

Exemplary Operation

Figure 4:
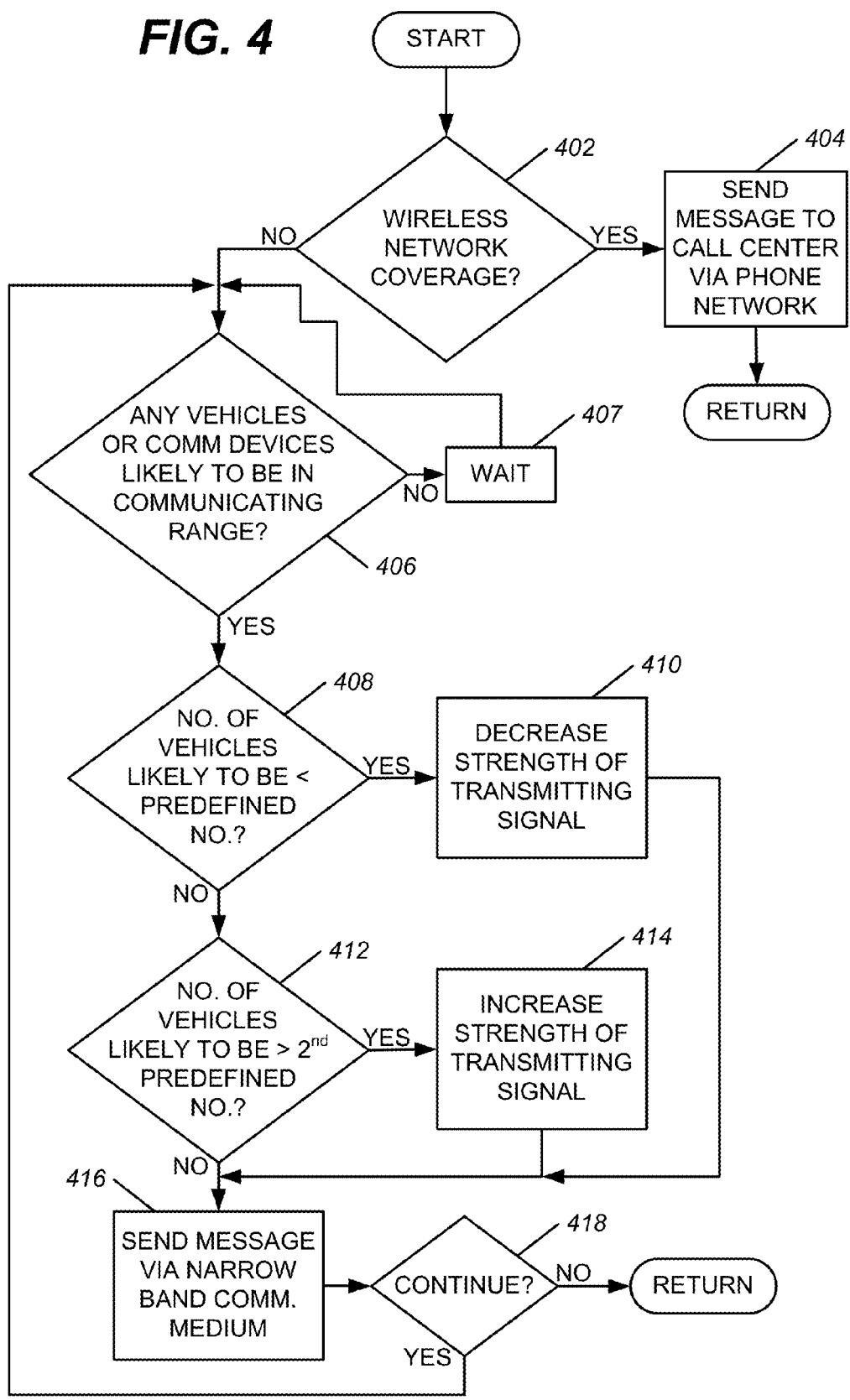
FIGS. 4-10 are flowcharts that illustrate exemplary processing in various embodiments.

FIG. 4 is a flowchart illustrating exemplary operation in various embodiments. The process may begin with a communicating device of a vehicle, such as a disabled vehicle, determining whether the communicating device is outside of an area covered by a wireless network (act 402). The wireless network may include, but not be limited to, a wireless phone network.

If, during act 402, the communicating device determines that the communicating device is within the area covered by the wireless network, then the communicating device may send, via a wireless network, the message to an intended recipient. The intended recipient may include, but not be limited to, call center 304 (act 304). The process may then be completed.

If, during act 402, the communicating device determines that the communicating device is outside of the area covered by the wireless network, then the communicating device may determine whether any vehicles with communicating devices are likely to be within a communicating range of the communicating device (act 406). In one embodiment, the communicating device may make the determination based on analyzing historical traffic data for a vicinity of the location of the communicating device. For example, the communicating device may analyze historical traffic data for the vicinity of the location at a particular time of day and day of week. In another embodiment, the communicating device may make the determination based on receiving information from one or more sensors or microphones for detecting other vehicles.

If, during act 406, the communicating device determines that no vehicles are likely to be within the communicating range, then the communicating device may wait a predefined period of time, such as, for example, 5 seconds, 10 seconds, or another predefined period of time (act 407) and may repeat act 406.

If, during act 406, the communicating device determines that one or more vehicles are likely to be within the communicating range, then the communicating device may determine whether a number of the one or more vehicles is likely to be less than a predefined number, such as, for example, 1, 3, or another number (act 408). If the communicating device determines the number of the one or more vehicles is likely to be less than the predefined number, the communicating device may decrease a strength of a transmitting signal (act 410).

In one embodiment, the communicating device may have a number of predefined strengths of a transmitting signal including, but not limited to, a low strength signal, a normal strength signal, and a high strength signal. The transmitting signal, by default, may be set to the normal strength signal. During act 410, the communicating device may change the strength of the transmitting signal to the low strength signal.

If, during act 408, the communicating device determines that the likely number of the one or more vehicles is not less than the predefined number, then the communicating device may determine whether the number of the one or more vehicles is greater than a second predefined number, which may be greater than or equal to the predefined number (act 412). If the communicating device determines that the likely number of the one or more vehicles is greater than the second predefined number, then the communicating device may increase the strength of the transmitting signal. For example, with respect to the embodiment described above, the communicating device may increase the strength of the transmitting signal to the high strength signal (act 414).

After performing act 410, 414, or 412, the communicating device may send the message via a narrow-band communication medium (act 416). The communicating device may then determine whether to continue sending the message (act 418). If the communicating device determines that the message is to continue being transmitted, then acts 406-416 may be repeated. Otherwise, the communicating device may end the process.

Although the exemplary process of FIG. 4 checks the likely number of vehicles against a predefined number and a second predefined number, other embodiments may perform checks with respect to the number of vehicles against a different number of predefined numbers. For example, a first check may be performed regarding the likely number of vehicles being less than a predefined number, a second check may be performed regarding the likely number of vehicles being greater than or equal to a second predefined number (which is greater than the predefined number) and less than a third predefined number (which is greater than the second predefined number), and a third check may be performed regarding the likely number of vehicles being greater than or equal to a fourth predefined number (which is greater than the third predefined number) and less than a fifth predefined number (which is greater than the fourth predefined number). If a condition with respect to the first check is satisfied, a strength of a transmitting signal may be set to low. If a condition with respect to the second check is satisfied, the strength of the transmitting signal may be set to low-normal. If a condition with respect to the third check is satisfied, the strength of the transmitting signal may be set to high-normal. If the likely number of the one or more vehicles is greater than the fifth predetermined number, then the strength of the transmitting signal may be set to high.

Figure 5:
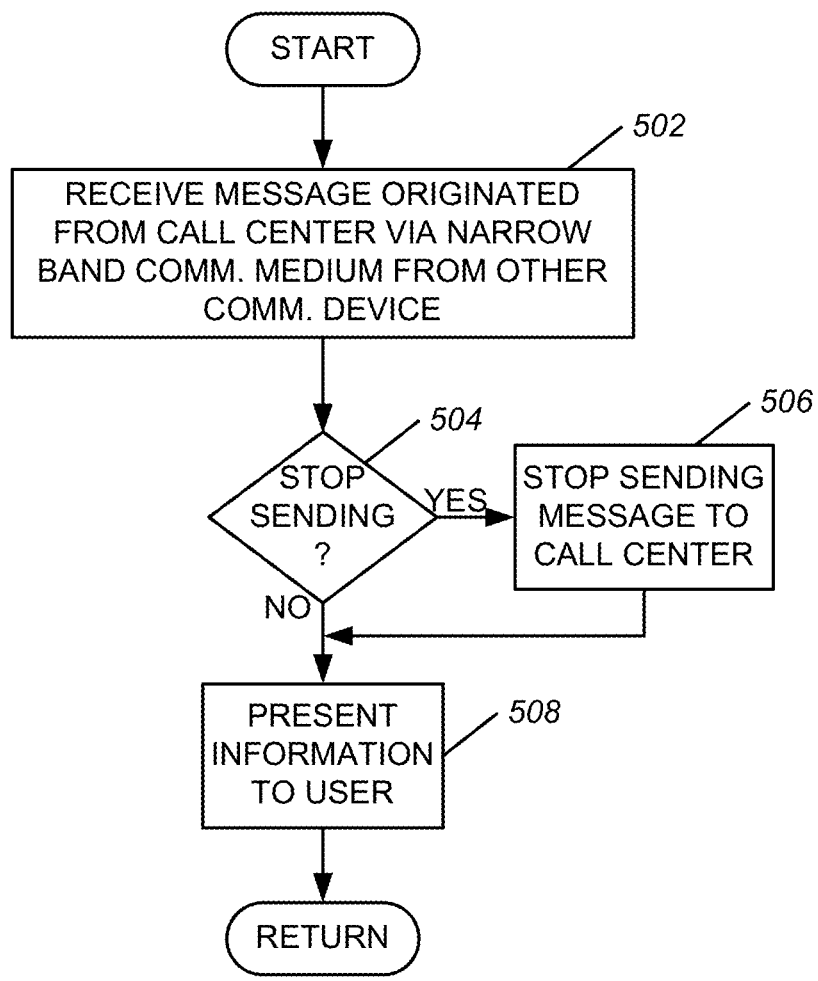

FIG. 5 is a flowchart illustrating an exemplary process in which a communicating device of a disabled vehicle receives a message from a call center in response to sending a message to the call center, as illustrated in the exemplary process of FIG. 4. The process may begin with the communicating device receiving a message, originated from the call center and received via a narrow-band communication medium from a second communicating device, in response to sending a message, intended for the call center, via the narrow-band communication medium (act 502). The received message may include, but not be limited to, a signal indicating that the communicating device is to stop sending the message intended for the call center, an expected arrival time of a rescue team, a closest waiting place, as well as other information.

The communicating device may determine whether the received message includes a signal indicating that the communicating device is to stop sending the message intended for the call center (act 504). If the received message is determined to include the signal indicating that the communicating device to stop sending the message intended for the call center, then the communicating device may stop sending the message intended for the call center (act 506). For example with reference to FIG. 4, the check performed at act 418 may determine whether the signal has been received, and if so, the process of FIG. 4 may be completed (the communicating device stops sending the message). Otherwise, acts 406-416 may be repeated by the communicating device.

Information from the received message may then be presented to the user (act 508). For example, information may be presented via a display screen of the communicating device, or via another method. The received message may include, but not be limited to, an expected arrival time of a rescue team, a stop sending signal, and information regarding a place to wait. The process may then be completed.

Figure 6:
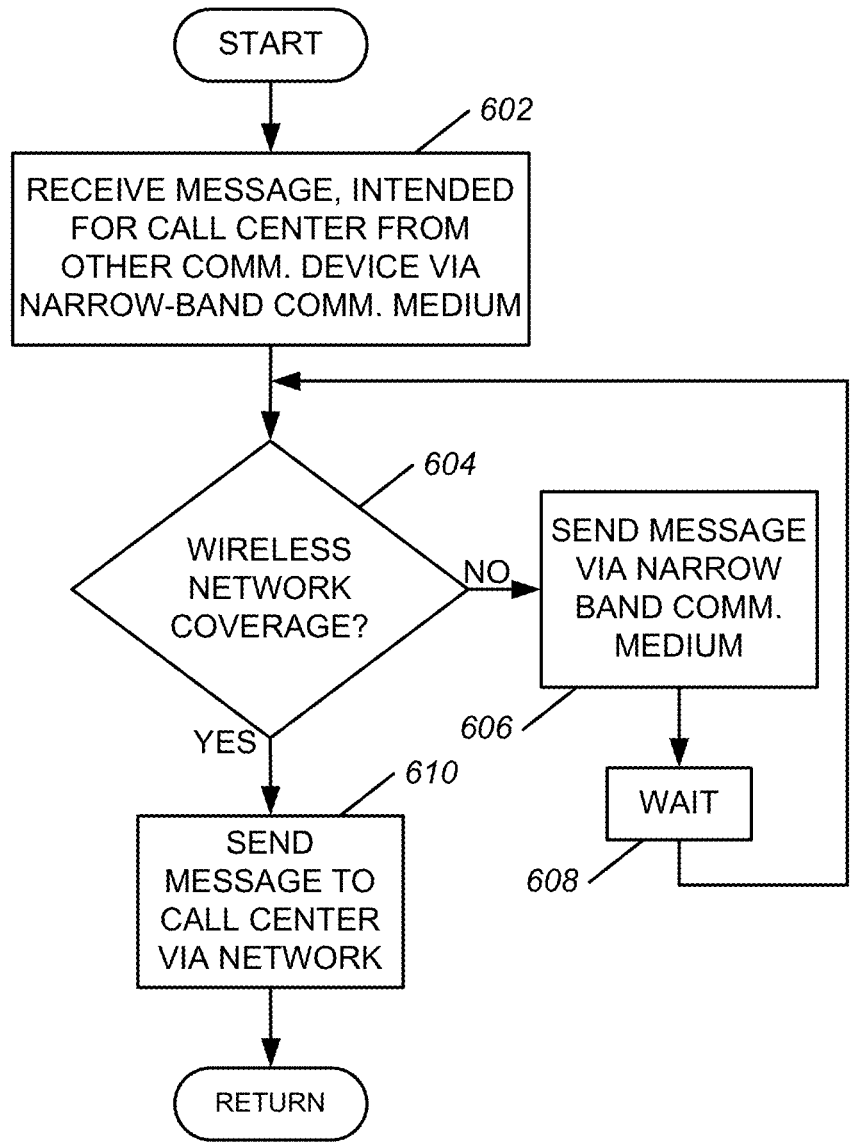

FIG. 6 is a flowchart illustrating an exemplary process in which a communicating device may receive a message intended for a call center from a second communicating device via a narrow-band communication medium. The process may begin with the communicating device receiving the message, intended for the call center, from a second communicating device via the narrow-band communication medium (act 602). The communicating device may then determine whether the communicating device has wireless network coverage (act 604). In some embodiments, a wireless network may include, but not be limited to, a wireless phone network.

If the communicating device determines that the communicating device does not have the wireless network coverage, then the communicating device may send the received message via the narrow-band communication medium, such that a third communicating device may receive the message (act 606). The communicating device may then wait a predetermined amount of time, such as, for example, 5 seconds, 10 seconds, or another suitable predetermined amount of time (act 608). The communicating device then may perform act 604 again to determine whether the communicating device has the wireless network coverage.

If, during act 604, the communicating device determines that the communicating device has the wireless network coverage, then the communicating device may send the received message to the call center via the wireless network (act 610). The process may then be completed.

Figure 7:
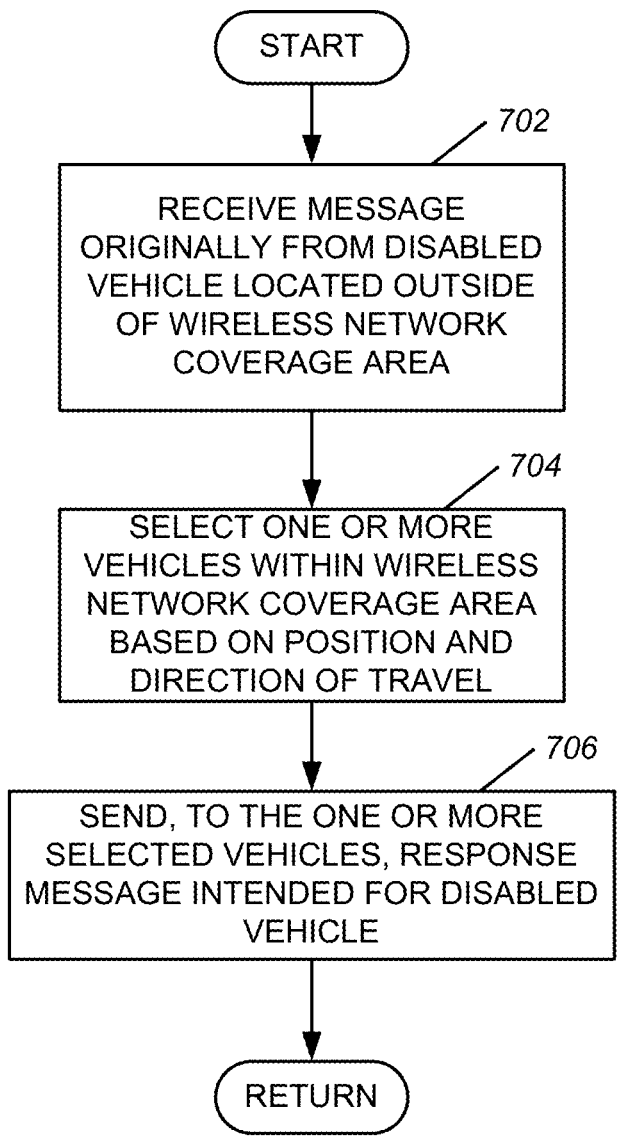

FIG. 7 is a flowchart illustrating an exemplary process which is performed by a call center. The process may begin with the call center receiving the message originally sent from a disabled vehicle located outside of a wireless network coverage area (act 702). The call center may select one or more vehicles, having communicating devices, within the wireless network coverage area based on a position and a direction of travel of the one or more vehicles (act 704).

In some embodiments, a communicating device may include a navigation device which may determine a location of a vehicle including the communicating device. The navigating device may determine a location and a direction of travel of the vehicle and the communicating device may include the location and the direction of travel in a report sent to the call center, assuming a user authorized the reporting of the location and the direction of travel.

The call center may respond to the received message originally sent from the disabled vehicle by sending a response message to one or more communicating devices in the one or more selected vehicles currently within the wireless network coverage area (act 706). The process may then be completed.

Figure 8:
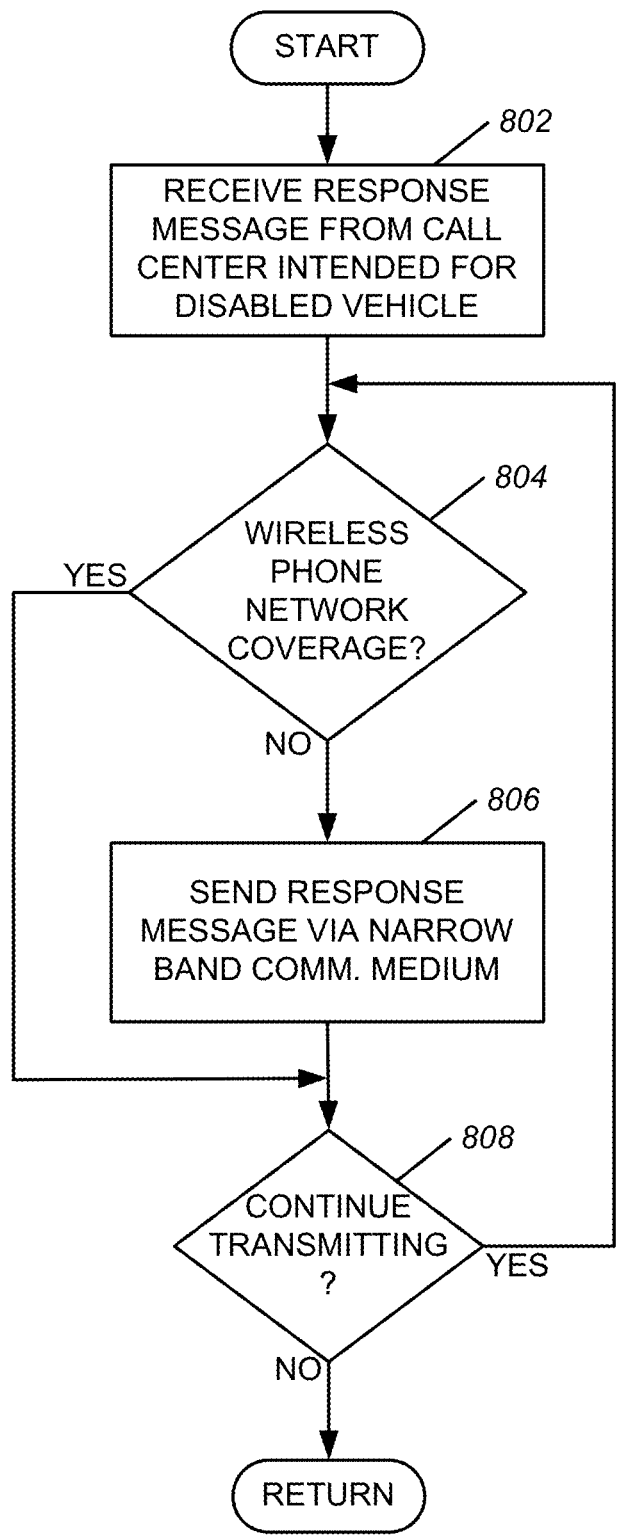

FIG. 8 is a flowchart illustrating an exemplary process which may be performed by a communicating device that receives the response message, intended for the disabled vehicle outside of the wireless network coverage area, from the call center. The process may begin with the communicating device within a vehicle receiving the response message, intended for the disabled vehicle, from the call center (act 802). The communicating device may then determine whether the communicating device is within the wireless network coverage area, which may include, but not be limited to, a wireless phone network (act 804).

If, during act 804, the communicating device determines that the communicating device is not within the wireless network coverage area, then the communicating device may send the response message via the narrow-band communication medium (act 806).

After determining that the communicating device is within the wireless network coverage area, or after sending the response message via the narrow-band communication medium, the communicating device may determine whether to continue transmitting the response message (act 808). In some embodiments, the communicating device may determine not to continue transmitting the response message after a predetermined time, such as, for example, an estimated arrival time of a rescue team or another time. If the communicating device determines not to continue transmitting the reply message, then the process may be complete. Otherwise, act 804-808 may be repeated by the communicating device.

Figure 9:
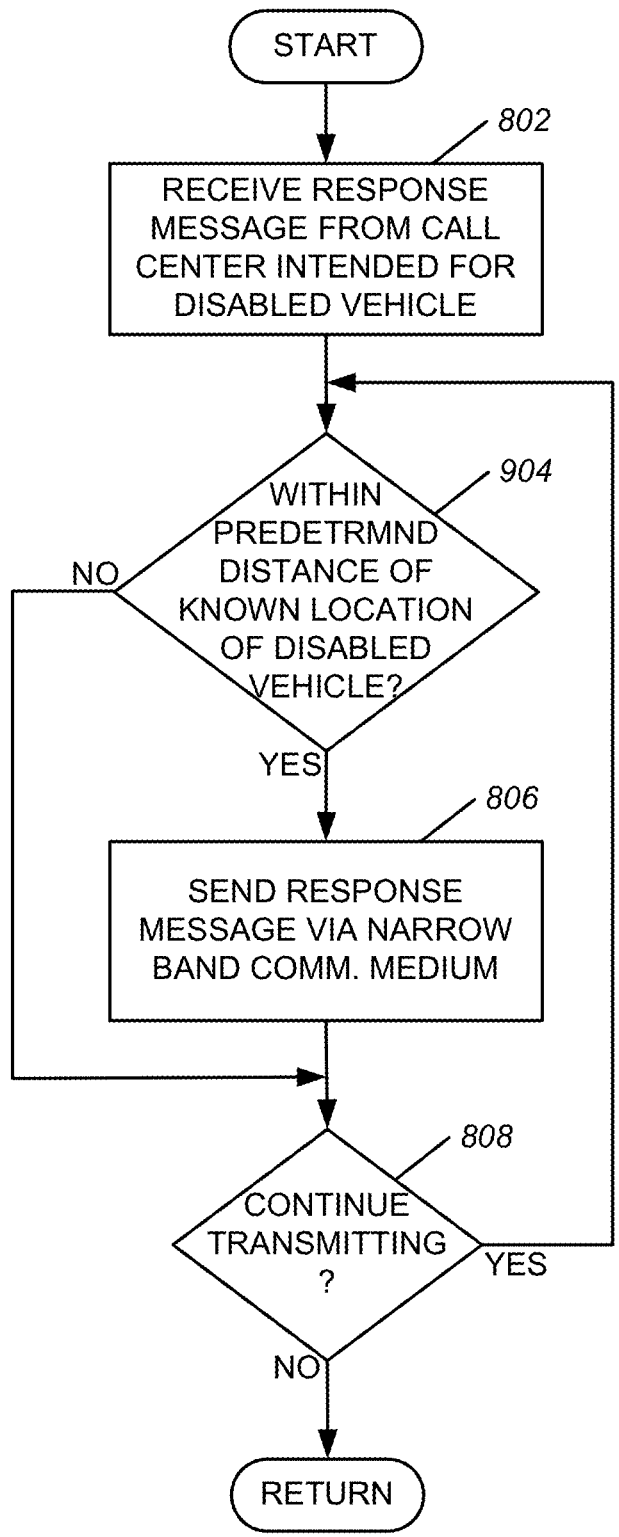

FIG. 9 is a flowchart illustrating exemplary processing in an alternative embodiment. As shown in FIG. 9, instead of determining whether the communicating device is within the wireless network coverage area during act 804, the communicating device may determine whether the communicating device is within a predetermined distance of a known location of the disabled vehicle (act 904; FIG. 9). The communicating device may then send the response message via the narrow-band communication medium only when the communication device is within the predetermined distance of the known location of the disabled vehicle (act 806; FIG. 9).

Figure 10:
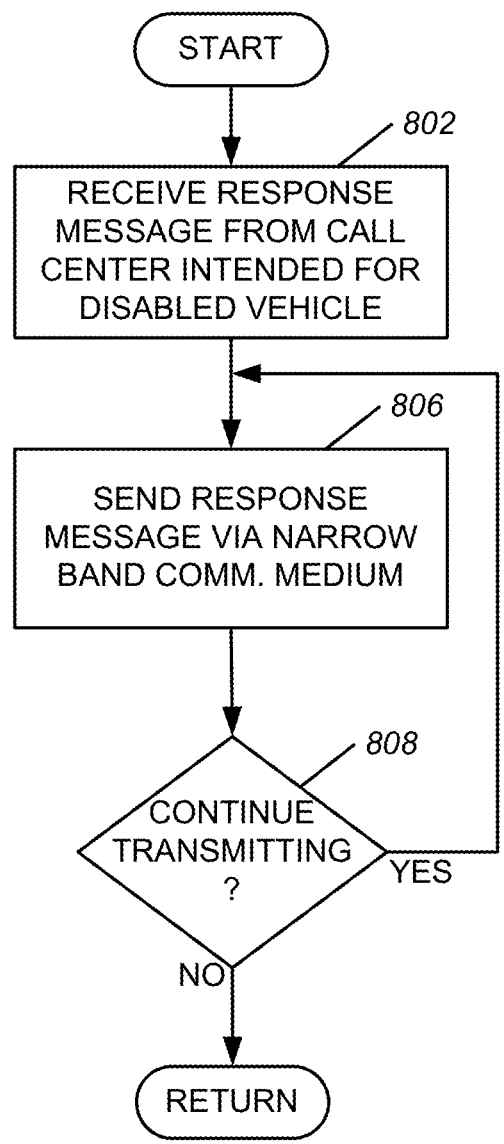

FIG. 10 is a flowchart illustrating exemplary processing in a second alternative embodiment. As shown in FIG. 10, instead of determining whether the communicating device is within the wireless network coverage area, the communicating device may send the response message via the narrow-band communication medium regardless of whether the communicating device is or is not within the wireless network coverage area (note that act 804 is missing from FIG. 10).

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not to be construed as limiting the claims in any way. Other configurations of the described embodiments are part of the scope of this disclosure. Accordingly, the appended claims and their legal equivalents define the invention, rather than any specific examples given.

We claim as our invention:

1. A method for providing a communication service, the method comprising:
    determining, by a first communicating device of a first vehicle, a lack of wireless phone network coverage for communicating a message from the first communication device;
    performing, when the lack of wireless phone network coverage is determined:
        determining, by the first communicating device, whether any vehicles are likely to be within a communicating range of the first communicating device,
        decreasing a strength of a transmitting signal of the first communicating device when no vehicle or less than a predefined number of vehicles are determined likely to be within the communicating range of the first communicating device,
        sending the message from the first communicating device to a second communicating device of a second vehicle via a narrow band communication medium, an intended final recipient of the message being a call center having the wireless phone network coverage, and
        receiving a second message by the first communicating device from a third communicating device of a third vehicle via the narrow band communication medium, the second message originating from the call center.

2. The method of claim 1, further comprising:
    increasing a strength of the transmitting signal of the first communicating device when at least a second predefined number of vehicles are determined likely to be within the communicating range of the first communicating device.

3. The method of claim 1, wherein the determining of whether any vehicles are likely to be within a communicating range of the first communicating device of the first originating vehicle further comprises:
    detecting a level of car noise via one or more noise sensors of the first vehicle.

4. The method of claim 1, wherein the determining of whether any vehicles are likely to be within a communicating range of the first communicating device of the first originating vehicle further comprises:
    analyzing historical vehicle traffic data.

5. The method of claim 1, wherein the message is an emergency message.

6. The method of claim 1, further comprising:
    ceasing to send the message from the first communicating device in response to receiving the second message.

7. A first communicating device adapted to perform a method comprising:
    determining whether the first communicating device has a lack of wireless phone network coverage;
    performing, when the determining determines that the first communicating device has the lack of the wireless phone network coverage:
        determining whether at least one other communicating device is likely to be within a communicating range of the first communication device via a narrow band communication medium, when the first communicating device is determined to have the lack of wireless phone network coverage, decreasing a strength of a transmitting signal when no vehicle or less than a predefined number of vehicles are determined likely to be within the communicating range, sending a first message to the at least one other communicating device via the narrow band communication medium when the at least one communicating device is determined likely to be within the communication range, an intended final recipient of the message being a call center having the wireless phone network coverage, and receiving a second message from a second communicating device via the narrow band communication medium, the second message having originated from the call center responsive to receiving the first message.

8. The first communicating device of claim 7, wherein:
the first message is an emergency message; and
the method further comprises:
ceasing the sending of the first message in response to receiving the second message.

9. The first communicating device of claim 7, wherein the determining whether at least one other communicating device is likely to be within a communicating range further comprises:
analyzing historical data to determine whether at least one communicating device is likely to be within the communicating range of the first communicating device.

10. The first communicating device of claim 7, wherein the determining whether at least one other communicating device is likely to be within a communicating range, further comprises:
detecting a level of noise via one or more sensors.

11. The first communicating device of claim 7, wherein the method further comprises:
increasing a strength of the transmitting signal when at least a second predefined number of communicating devices are determined likely to be within the communicating range of the first communicating device.

12. The first communicating device of claim 7, wherein the method further comprises:
sending the first message to the call center via a wireless phone network when the determining determines that the first communicating device is determined to have the wireless phone network coverage.

13. The first communicating device of claim 7, wherein the method further comprises:
repeating, until the second message is received, the sending the first message via the narrow band communication medium when the first communicating device lacks the wireless phone network coverage.

14. A method for communicating messages, the method comprising:
determining, by a first communicating device integrated into an automobile, whether the first communicating device is able to communicate via a wireless phone network;
when the determining determines that the first communicating device is not able to communicate via the wireless phone network, performing:
determining, by the first communicating device, whether any automobiles are likely to be within a communicating range of the first communication device, decreasing, by the first communicating device, a strength of a transmitting signal when less than a predefined number of automobiles are determined likely to be within the communicating range of the first communicating device, sending, by the first communicating device to a second communicating device integrated into a second automobile, a first message via a narrow band communication medium, an intended final recipient of the first message being a call center accessible via the wireless phone network, and receiving, by the first communicating device from a third communicating device integrated into a third automobile, a second message via the narrow band communication medium, the second message having originated from the call center.

15. The method of claim 14, wherein:
the second message includes a stop sending command, and
the first communicating device stops transmitting the first message responsive to receiving the second message including the stop sending command.

16. The method of claim 14, wherein:
the first message is an emergency message, and
the second message includes an emergency team estimated arrival time.

17. The method of claim 14, further comprising:
increasing a strength of the transmitting signal when at least a second predefined number of automobiles are determined likely to be within the communicating range of the first communicating device.

18. The method of claim 14, wherein the determining, by the first communicating device, whether any automobiles are likely to be within a communicating range of the first communication device, further comprises:
analyzing historical traffic data.

19. The method of claim 14, wherein the determining, by the first communicating device, whether any automobiles are likely to be within a communicating range of the first communication device, further comprises:
detecting a level of noise via one or more sensors.

20. The method of claim 1, further comprising:
determining, by the first communicating device, that the received second message includes a stop sending signal; and
ceasing to send the message after determining that the received second message includes the stop sending signal.

21. The first communicating device of claim 7, wherein:
the received second message includes an estimated arrival time of a rescue team; and
the method further comprises ceasing the sending of the first message after the estimated arrival time of the rescue team.

* * * * *